United States Patent
Yamamoto et al.

(10) Patent No.: US 12,009,506 B2
(45) Date of Patent: Jun. 11, 2024

(54) NONAQUEOUS ELECTROLYTE SECONDARY BATTERY

(71) Applicants: Toyota Jidosha Kabushiki Kaisha, Toyota (JP); Sumitomo Metal Mining Co., Ltd., Tokyo (JP)

(72) Inventors: Yuji Yamamoto, Toyota (JP); Momoko Procter, Seto (JP); Yoshinari Makimura, Nisshin (JP); Tetsutaro Hayashi, Niihama (JP); Willy Shun Kai Bong, Niihama (JP)

(73) Assignees: TOYOTA JIDOSHA KABUSHIKI KAISHA AND, Toyota (JP); SUMITOMO METAL MINING CO., LTD., Tokyo (JP)

( * ) Notice: Subject to any disclaimer, the term of this patent is extended or adjusted under 35 U.S.C. 154(b) by 385 days.

(21) Appl. No.: 16/930,746

(22) Filed: Jul. 16, 2020

(65) Prior Publication Data
US 2021/0020925 A1 Jan. 21, 2021

(30) Foreign Application Priority Data
Jul. 18, 2019 (JP) .................................. 2019-133135

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/131* (2013.01); *H01M 4/485* (2013.01); *H01M 10/0525* (2013.01); *H01M 2004/027* (2013.01)

(58) Field of Classification Search
CPC ...... H01M 4/02; H01M 4/0471; H01M 4/139; H01M 4/48; H01M 4/52; H01M 4/1391;
(Continued)

(56) References Cited

U.S. PATENT DOCUMENTS

2012/0231341 A1* 9/2012 Kim ..................... C01G 53/42
977/773
2018/0123118 A1* 5/2018 Furuichi ........... H01M 10/0525
(Continued)

FOREIGN PATENT DOCUMENTS

| CN | 102683696 A | 9/2012 |
| CN | 107534144 A | 1/2018 |

(Continued)

OTHER PUBLICATIONS

Fu et al. Electrochemical Properties of the LiNi0.6Co0.2Mn0.2O2 Cathode Material Modified by Lithium Tungstate under High Voltage. ACS Applied Materials & Interfaces 10, p. 19704-19711 (Year: 2018).*

(Continued)

*Primary Examiner* — Allison Bourke
*Assistant Examiner* — Bethany C Garcia
(74) *Attorney, Agent, or Firm* — Dinsmore & Shohl LLP (57) ABSTRACT

The present disclosure can bring excellent output characteristics to a nonaqueous electrolyte secondary battery that uses a cathode active material containing tungsten while desired durability is secured. The battery of the present disclosure includes a cathode, an anode, and a nonaqueous electrolyte. The cathode includes a cathode active material layer that contains a granular cathode active material. The cathode active material includes a core part that contains a lithium-transition metal composite oxide of a layered structure; a tungsten-concentrated layer that is formed over a surface of the core part and has a higher tungsten concentration than in the core part; and a lithium-tungsten compound particle that adheres to at least part of a surface of the tungsten-concentrated layer and contains tungsten and lithium. In the battery of the present disclosure, the tungsten-concentrated layer (Continued)

has an amorphous structure. This can bring excellent output characteristics while desired durability is secured.

5 Claims, 3 Drawing Sheets

(51) Int. Cl.
*H01M 4/131* (2010.01)
*H01M 4/485* (2010.01)
*H01M 10/0525* (2010.01)

(58) Field of Classification Search
CPC ........ H01M 4/366; H01M 4/131; H01M 4/36; H01M 4/362; H01M 4/483; H01M 4/133; H01M 4/134; H01M 10/05; H01M 10/052; H01M 10/0525; H01M 10/0562; H01M 10/0587; H01M 2004/021; H01M 2004/028; H01M 2220/20; H01M 2220/30; H01M 4/485–525; H01M 4/38; C01P 2002/01–88; C01P 2004/03–84; C01P 2006/11–90; C01G 41/00–04; C01G 45/00–1292; C01G 51/00–70; C01G 53/00–70; Y02E 60/10; Y02T 10/70

See application file for complete search history.

(56) References Cited

U.S. PATENT DOCUMENTS

| | | | |
|---|---|---|---|
| 2018/0212233 A1* | 7/2018 | Ito | H01M 10/0562 |
| 2019/0020023 A1 | 1/2019 | Yokoyama et al. | |

FOREIGN PATENT DOCUMENTS

| | | |
|---|---|---|
| JP | 2014-183031 A | 9/2014 |
| JP | 2017-084628 A | 5/2017 |
| JP | 2019-019047 A | 2/2019 |

OTHER PUBLICATIONS

Meng et al., "Modification by simultaneously ϒ-WO3/Li2WO4 composite coating and spinel-structure formation on Li[Li0.2Mn0.54Ni0.13Co0.13]O2 cathode via a simple wet process," Journal of Alloys and Compounds 790 (2019) p. 421-432. (Year: 2019).*

* cited by examiner

NONAQUEOUS ELECTROLYTE SECONDARY BATTERY

CROSS REFERENCE TO RELATED APPLICATIONS

This application claims priority to Japanese Patent Application No. 2019-133135, filed Jul. 18, 2019, the entire contents of which are incorporated herein by reference.

BACKGROUND

1. Technical Field

The present disclosure relates to a nonaqueous electrolyte secondary battery.

2. Description of the Related Art

In recent years, nonaqueous electrolyte secondary batteries such as lithium ion secondary batteries have been used for portable power supplies of personal computers, mobile terminals, etc., power sources for driving vehicles such as electric vehicles (EV), hybrid vehicles (HV), and plug-in hybrid vehicles (PHV), and so on.

Generally, a cathode active material that can store and release ions that are to be charge carriers is used for cathodes of nonaqueous electrolyte secondary batteries. One example of the cathode active material is a lithium-transition metal composite oxide having a layered structure. For example, see JP2017-84628 and JP2019-19047. For example, in JP2017-84628, a cathode active material such that a lithium-tungsten compound (LW compound) is present in a lithium-transition metal composite oxide of a layered structure is used. This can reduce the cathode resistance to improve output characteristics etc. JP2019-19047 discloses the technique such that a tungsten-concentrated layer is formed on a surface of a metal composite hydroxide that is a precursor of a lithium-transition metal composite oxide. This can generate a cathode active material having high output characteristics and high crystallinity (lithium-transition metal composite oxide).

SUMMARY

In recent years, performance improvements for nonaqueous electrolyte secondary batteries have been more and more in demand, and development of a cathode active material that can lead to better performance than the conventional has been demanded. As a result of the intensive studies of the inventors of the present disclosure in response to such demand, it was found that there is still room for improvement in a cathode active material containing tungsten (W) as described above while such a cathode active material can be effective in improvements for output characteristics following a reduction in the cathode resistance to a certain degree or more.

The present disclosure was made for responding to the foregoing demand. An object of the present disclosure is to bring excellent output characteristics to a nonaqueous electrolyte secondary battery that uses a cathode active material containing tungsten while desired durability is secured.

A nonaqueous electrolyte secondary battery of the present disclosure includes a cathode, an anode, and a nonaqueous electrolyte. The cathode of this nonaqueous electrolyte secondary battery includes a cathode active material layer that contains a granular cathode active material. This cathode active material includes: a core part that contains a lithium-transition metal composite oxide of a layered structure; a tungsten-concentrated layer that is formed over a surface of the core part and has a higher tungsten concentration, which is determined by a TEM-EDX analysis, than the core part, and a lithium-tungsten compound particle that adheres to at least part of a surface of the tungsten-concentrated layer and contains tungsten and lithium. In the nonaqueous electrolyte secondary battery of the present disclosure, the tungsten-concentrated layer has an amorphous structure.

The foregoing structure can bring excellent output characteristics while securing desired durability. The reason why such effect can be obtained may be considered as follows.

First, the tungsten-concentrated layer is formed over the surface of the core part, which can suppress deterioration due to elimination of oxygen from the core part (the lithium-transition metal composite oxide of a layered structure). An LW compound (lithium-tungsten compound) adhering to the surface of the tungsten-concentrated layer can suppress deterioration due to contact with the nonaqueous electrolyte. As described above, in the nonaqueous electrolyte secondary battery of the present disclosure, deterioration of the cathode active material may be suppressed, which can secure durability to a certain degree or more.

Next, the tungsten-concentrated layer has not only the foregoing function of suppressing deterioration of the core part, but also the function of improving diffusion in solid over the surface of the active material, and thus can also contribute to improvements for diffusibility of Li ions in the cathode. The LW compound has the function of improving the concentration of Li ions on the surface of the cathode active material. These functions are effective in improvements for output following a reduction in the cathode resistance.

In addition, in the battery of the present disclosure, the tungsten-concentrated layer is amorphized. This increases active sites on the surface of the active material, to extensively improve insertion and elimination of Li ions in the cathode. This can result in a further reduction in the cathode resistance to bring excellent output characteristics.

In one aspect of the nonaqueous electrolyte secondary battery of the present disclosure, the atomic concentration of tungsten in the tungsten-concentrated layer is 1 atomic percent (at %) or more and 3.6 at % or less. This makes it possible to achieve a higher level of durability and output characteristics at the same time.

In one aspect of the nonaqueous electrolyte secondary battery of the present disclosure, the atomic concentration of tungsten in the core part is 0.3 at % or less. This can further improve durability.

DETAILED DESCRIPTION

Hereinafter a lithium ion secondary battery will be described as one embodiment of a nonaqueous electrolyte secondary battery of the present disclosure with reference to the drawings. Matters necessary for enabling the present disclosure other than those specifically mentioned in the present description, such as a general structure and a manufacturing process of nonaqueous electrolyte secondary batteries which are not features of the present disclosure may be recognized as design matters by the person skilled in the art based on the conventional art. The present disclosure is enabled based on the contents disclosed herein, and the technical common sense in the art. In the following drawings, the same reference signs will be added to members and parts that operate the same for their description. The proportions of measures including length, width, thickness, etc. in each drawing do not reflect the actual proportions.

The "secondary battery" herein means a general electricity storage device that can be repeatedly charged and discharged, and is a term encompassing an electricity storage device such as a so-called storage battery and an electric double layer capacitor.

1. Lithium Ion Secondary Battery

Hereinafter a flat rectangular lithium ion secondary battery having a flat wound electrode body and a flat battery case will be described as one embodiment of the present disclosure. The following description is not intended to limit the present disclosure to the following embodiments.

i. Entire Structure

Figure 1:
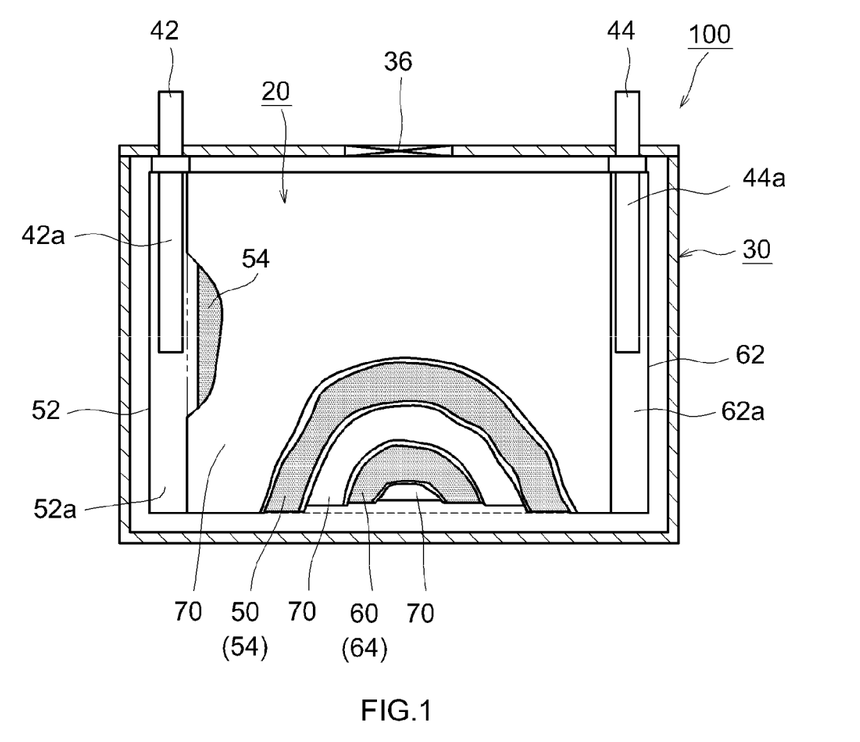
FIG. 1 is a cross-sectional view schematically showing an internal structure of a lithium ion secondary battery according to one embodiment.

FIG. 1 is a cross-sectional view schematically showing an internal structure of a lithium ion secondary battery 100 according to the present embodiment. The lithium ion secondary battery 100 shown in FIG. 1 is made by storing a flat wound electrode body 20 and a nonaqueous electrolyte (not shown) into the inside of a flat rectangular battery case 30 (that is, outer packaging). As the material of the battery case 30, for example, a lightweight metallic material of high thermal conductivity such as aluminum is used. The battery case 30 is provided with a cathode terminal 42 and an anode terminal 44 as external connection terminals. The cathode terminal 42 is electrically connected to a cathode current collector plate 42a. The anode terminal 44 is electrically connected to an anode current collector plate 44a. Further, the battery case 30 is also provided with a relief valve 36 for suppressing deformation of the case when the internal pressure rises, and an inlet for pouring a nonaqueous electrolyte (omitted in the drawing).

Figure 2:
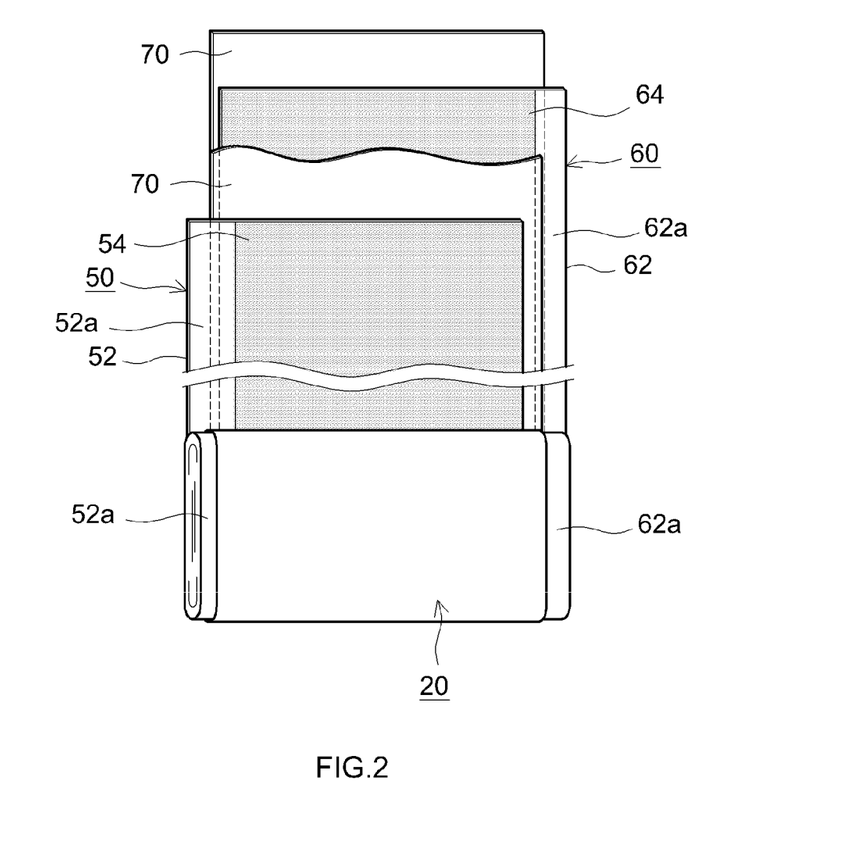
FIG. 2 is a schematic view showing a structure of a wound electrode body of the lithium ion secondary battery according to one embodiment.

FIG. 2 is a schematic view showing structure of the wound electrode body 20 of the lithium ion secondary battery 100 according to the present embodiment. As shown in FIGS. 1 and 2, this wound electrode body 20 is formed by winding a layered body such that a long cathode sheet 50 and an anode sheet 60 are layered to each other via two long separators 70. The cathode sheet 50 includes a long cathode current collector 52 in the form of foil (for example, aluminum foil), and a cathode active material layer 54 that is applied over a surface (for example, both faces) of the cathode current collector 52. The anode sheet 60 includes a long anode current collector 62 in the form of foil (for example, copper foil), and an anode active material layer 64 that is applied over a surface (for example, both faces) of the anode current collector 62.

Apart where the cathode active material layer 54 is not applied to expose the cathode current collector 52 (cathode active material layer non-forming part 52a) is formed on the cathode sheet 50 on one side edge portion in the width direction; and a part where the anode active material layer 64 is not applied to expose the anode current collector 62 (anode active material layer non-forming part 62a) is formed on the anode sheet 60 on the other side edge portion in the width direction. In the present embodiment, the cathode sheet 50 and the anode sheet 60 are layered to each other so that the cathode active material layer non-forming part 52a sticks out of the one side edge portion and the anode active material layer non-forming part 62a sticks out of the other side edge portion. This layered body is wound to form the wound electrode body 20. As shown in FIG. 1, the cathode current collector plate 42a is connected to the wound cathode active material layer non-forming part 52a, and the anode current collector plate 44a is connected to the wound anode active material layer non-forming part 62a.

Figure 3:
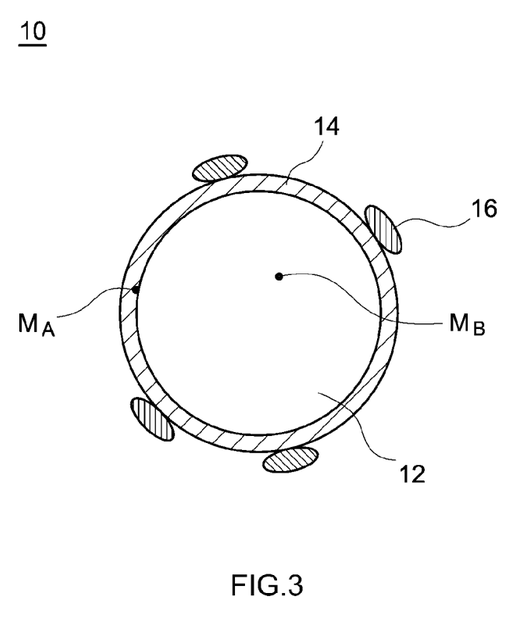
FIG. 3 is a cross-sectional view schematically showing one example of a cathode active material that is used in the lithium ion secondary battery according to one embodiment.

The cathode active material layer 54 in the present embodiment contains a cathode active material 10 as shown in FIG. 3. This cathode active material 10 will be described in detail later. The content of the cathode active material 10 in the cathode active material layer 54 (that is, based on the total mass of the cathode active material layer 54) is not particularly limited, but can be 70 mass % or more, and can be 80 mass % or more. The cathode active material layer 54 may further contain constituents other than the cathode active material 10 such as trilithium phosphate, a conductive material, and a binder. As the conductive material, for example, carbon black such as acetylene black (AB), and any other carbon material such as graphite may be used. As the binder, for example, polyvinylidene fluoride (PVDF) or the like may be used. While there is no intention to limit the present disclosure, the content of trilithium phosphate when trilithium phosphate is added to the cathode active material layer 54 can be 1 mass % or more and 15 mass % or less, and can be 2 mass % or more and 12 mass % or less; the content of the conductive material when the conductive material is added thereto can be 1 mass % or more and 15 mass % or less, and can be 3 mass % or more and 13 mass % or less; and the content of the binder when the binder is added thereto can be 1 mass % or more and 15 mass % or less, and can be 1.5 mass % or more and 10 mass % or less.

The anode active material layer 64 contains a granular anode active material. As such an anode active material, for example, a carbon material such as graphite, hard carbon, and soft carbon may be used. Graphite may be natural graphite, may be artificial graphite, and may be amorphous carbon-coated graphite that has the aspect such that graphite is coated with an amorphous carbon material. The content of the anode active material in the anode active material layer 64 is not particularly limited, but can be 90 mass % or more, and can be 95 mass % or more and 99 mass % or less. The anode active material layer 64 may contain constituents other than the anode active material such as a binder and a thickener. As the binder, for example, styrene-butadiene rubber (SBR), polyvinylidene fluoride (PVDF), or the like may be used. As the thickener, for example, carboxymethyl cellulose (CMC), or the like may be used. While there is no intention to limit the present disclosure, the content of the binder when the binder is added to the anode active material layer 64 can be 0.1 mass % or more and 8 mass % or less, and can be 0.5 mass % or more and 3 mass % or less; and the content of the thickener when the thickener is added thereto can be 0.3 mass % or more and 3 mass % or less, and can be 0.5 mass % or more and 2 mass % or less.

As the separators 70, insulating sheets that have micropores permissible to charge carriers such as lithium ions may be used. As these separators 70, for example, porous sheets or films made from a resin of polyethylene(PE), polypropylene (PP), polyester, cellulose, polyamide, or the like may be used. The separators 70 may have a single-layer structure, and may have a multilayer structure such that two or more layers are layered to each other. One example of the separators 70 of a multilayer structure is a separator of a triple-layer structure such that a PP layer is layered on both faces of a PE layer. A heat resistance layer (HRL) may be provided for a surface of the separators 70.

The nonaqueous electrolyte typically contains a nonaqueous solvent and a supporting salt.

As the nonaqueous solvent, any of various organic solvents which are used for electrolyte solutions of a general lithium ion secondary battery, such as carbonates, ethers, esters, nitriles, sulfones, and lactones may be used without particular limitation. Specific examples thereof include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC). One of such nonaqueous solvents may be used alone, or two or more of them may be suitably used in combination.

As the supporting salt, for example, a lithium salt such as $LiPF_6$, $LiBF_4$, and lithium bis(fluorosulfonyl)imide (LiFSI) may be used. In embodiments, the lithium salt may be $LiPF_6$. The concentration of the supporting salt can be 0.7 mol/L to 1.3 mol/L.

The nonaqueous electrolyte may contain any constituent other than the foregoing constituents as long as the effect of the present disclosure is not extremely spoiled. Examples of constituents that may be added to the nonaqueous electrolyte (additives) include gas forming agents such as biphenyl (BP) and cyclohexylbenzene (CHB), and thickeners.

ii. Cathode Active Material

Next, the cathode active material used in the present embodiment will be described. FIG. 3 is a cross-sectional view schematically showing one example of the cathode active material 10 used in the lithium ion secondary battery 100 according to the present embodiment. As shown in FIG. 3, this cathode active material 10 includes a core part 12, a tungsten-concentrated layer 14, and a lithium tungsten compound particle 16. Hereinafter each of them will be described.

a. Core Part

The core part 12 is a particle containing a lithium-transition metal composite oxide of a layered structure. The lithium-transition metal composite oxide is a metal oxide containing at least lithium Li and a transition metal element constituting a layered structure. Examples of such a lithium-transition metal composite oxide include lithium-nickel composite oxides, lithium-manganese composite oxides, lithium-cobalt composite oxides, lithium-nickel-cobalt-aluminum composite oxides, lithium-iron-nickel-manganese composite oxides, and lithium-nickel-cobalt-manganese composite oxides. Among them, lithium-nickel-cobalt-manganese composite oxides can bring especially excellent output characteristics. The "lithium-nickel-cobalt-manganese composite oxide" herein is not limited to a metal oxide whose constituent elements are Li, Ni, Co, Mn and O only, but encompasses oxides also containing any additive elements other than Li, Ni, Co, Mn, and O. At this time, examples of additive elements include metal elements such as W, Mg, Ca, Al, Ti, V, Cr, Si, Y, Zr, Nb, Mo, Hf, Ta, Na, Fe, Zn, and Sn. Additive elements may include metalloids such as B. C. Si and P, non-metallic elements such as S, F, Cl, Br, and I, etc. The content of the additive elements on the basis of lithium in the core part 12 can be 0.1 mol or less. This is applied not only when a lithium-nickel-cobalt-manganese composite oxide, but also when any of other lithium-transition metal composite oxides such as lithium-nickel composite oxides, lithium-cobalt composite oxides, lithium-manganese composite oxides, lithium-nickel-cobalt-aluminum composite oxides, and lithium-iron-nickel-manganese composite oxides are used as the core part 12.

Tungsten (W) is an additive element to the core part 12 in view of improvements for output characteristics and durability. In contrast, too high a W content in the core part 12 may cause constituent elements to increasingly liquate out in a high temperature environment, which may lead to degradation in durability. In view of such a point, the upper limit of the atomic concentration B of tungsten in the core part 12 can be 0.4 at % or less, can be 0.3 at % or less, or can be 0.2 at % or less. Atomic concentration herein is provided in units of atomic percent, abbreviated at %, which is equal to the number of atoms of a particular element divided the total number of atoms and multiplied by 100. The presence or not of W in the core part 12 however does not limit the present disclosure. That is, the atomic concentration B of tungsten in the core part 12 may be 0 at %. In view of output characteristics and durability, the atomic concentration B of tungsten in the core part 12 can be 0.01 at % or more, can be 0.05 at % or more, or can be 0.1 at % or more.

"Atomic concentration B of tungsten in the core part" herein is measured based on the following procedures. First, by TEM-EDX, a plurality (for example, 20) of the cathode active materials 10 are randomly selected and images thereof are taken, an area with a radius of 3 nm with a point 100 nm radially inwards from the surface of the tungsten-concentrated layer 14, which will be described later, for the center is set for the cathode active materials as a measurement area $M_B$ in FIG. 3. Next, a plurality (for example, 5) of the measurement areas $M_B$ are set for each of the cathode active materials 10 to be measured, and "the number of atoms of tungsten (W)" and "the number of atoms of transition metal elements such as Ni, Co, Mn and W" in each measurement area $M_B$ are measured. Then, the proportion of the number of W atoms in total when the number of atoms of the transition metal elements measured in each measurement area in total is defined as 100 at % is calculated, which makes it possible to measure "atomic concentration B of tungsten in the core part".

The mean particle size (median size: D50) of the core part 12 is not particularly limited, but for example, can be 20 μm or less, can be 15 μm or less, or can be 10 μm or less. This can secure the specific surface area of the core part 12 to reduce the cathode resistance more. In contrast, in view of suppression of formation of a coarse secondary particle due to aggregation of the core parts 12, the lower limit of the mean particle size of the core part 12 can be 0.1 μm or more, can be 0.5 μm or more, or can be 3 μm or more. "Mean particle size" herein can be calculated by, for example, obtaining a cross sectional TEM image of the cathode active material layer 54, randomly selecting 20 or more of the cathode active materials 10 in the cross sectional TEM image, and calculating the mean value of the particle sizes of objects to be measured (for example, core parts) which are confirmed in the selected cathode active materials 10. In the cross sectional TEM image, the core part 12 is observed as a particle where a layered crystal structure is confirmed.

When the core part 12 is prepared, any conventionally known method that is used for preparing particles of lithium-transition metal composite oxides may be used without limitation. For example, a precursor of the lithium-transition metal composite oxide (for example, metal hydroxide) is generated using a crystallization method or the like, and lithium is introduced into the precursor, which makes it possible to form the core part 12 containing the lithium-transition metal composite oxide of a layered structure.

b. Tungsten Concentration Layer

As shown in FIG. 3, the cathode active material 10 in the present embodiment is such that the tungsten-concentrated layer 14 whose concentration of tungsten is higher than that of the core part 12 is formed over the surface of the core part 12. Typically, the tungsten-concentrated layer 14 is constituted of a metal oxide containing lithium Li, tungsten W and any other element(s). "Any other element(s)" in this tungsten-concentrated layer 14 may be the same as the foregoing constituent elements of the core part 12. That is, the tungsten-concentrated layer 14 may contain Ni, Co, Mn, Mg, Ca, Al, Ti, V, Cr, Si, Y, Zr, Nb, Mo, Hf, Ta, Na. Fe, Zn, Sn, B, C, Si, P, S, F, Cl, and the like, other than Li and W. The constituent elements of the tungsten-concentrated layer 14 are not necessarily the same as, but may be suitably changed from those of the core part 12. For example, when the core part 12 is constituted of a W-containing lithium-nickel-cobalt-manganese composite oxide, the tungsten-concentrated layer 14 may be constituted of a W-containing lithium-nickel-cobalt-manganese composite oxide, and may be constituted of a W-containing lithium-nickel composite oxide, a W-containing lithium-manganese composite oxide, a W-containing lithium-cobalt composite oxide, a W-containing lithium-nickel-cobalt-aluminum composite oxide, a W-containing lithium-iron-nickel-manganese composite oxide, or the like. In embodiments, the constituent elements of the tungsten-concentrated layer 14 are the same as those of the core part 12 in view of easy formation over the surface of the core part 12.

In the tungsten-concentrated layer 14, W at a higher concentration than in the core part 12 is confirmed. In other words, in the cathode active material 10 in the present embodiment, the W atomic concentration A in the tungsten-concentrated layer 14 is higher than the foregoing W atomic concentration B in the core part 12 (A>B). As described above, formation of the tungsten-concentrated layer 14 over the surface of the core part 12 can prevent the cathode active material 10 from deteriorating due to elimination of oxygen from the core part 12 to improve the durability of the battery. Since making it possible to improve diffusion in solid over the surface of the cathode active material 10 to improve diffusibility of Li ions, the tungsten-concentrated layer 14 can contribute to a reduction in the cathode resistance.

"W atomic concentration A in the tungsten-concentrated layer" herein can be measured according to similar procedures to those for the foregoing "W atomic concentration B in the core part". That is, by TEM-EDX, images of a plurality (for example, 20) of the cathode active materials 10 are taken, a plurality of measurement areas $M_A$ are set in the vicinity of the surface of each of the cathode active materials 10, the atomic concentrations (at %) of W in the plurality of measurement areas $M_A$ are measured, and thereafter the mean value thereof is calculated. The measurement area $M_A$ when "W atomic concentration A in the tungsten-concentrated layer" is obtained is an area with a radius of 3 nm with a point 5 nm radially inwards from the surface of the tungsten-concentrated layer 14 for the center.

In view of a more effective reduction of the resistance, the W atomic concentration A in the tungsten-concentrated layer 14 can be 0.5 at % or more, or can be 0.8 at % or more. Particularly, it has been confirmed that the W atomic concentration A in the tungsten-concentrated layer 14 at 1 at % or more leads to a large reduction of the cathode resistance. In contrast, in view of suppression of degradation of durability due to liquation of the constituent elements, the upper limit of the W atomic concentration A in the tungsten-concentrated layer 14 can be 3.6 at % or less, can be 3.3 at % or less, or can be 2.6 at % or less.

In addition, in the present embodiment, the tungsten-concentrated layer 14 is amorphized for further reducing the cathode resistance. It has been confirmed in some experiments that formation of such a tungsten-concentrated layer 14 having an amorphous structure over the surface of the cathode active material 10 can bring excellent output characteristics. While there is no intention to limit the present disclosure, it is assumed that such effect is brought by the following operations. The surface of a general cathode active material is constituted of a lithium-transition metal composite oxide of a layered structure. In such a lithium-transition metal composite oxide of a layered structure, insertion and elimination of Li ions occur between layers of crystal structures, which limits directions and places of insertion and elimination of Li ions on a surface of the particle. In contrast, in the present embodiment, the tungsten-concentrated layer 14 of an amorphous stricture, which does not have an ordered crystal structure, is formed over the surface of the particle, which increases active sites on the surface of the particle to smooth insertion and elimination of Li ions. As a result, the cathode resistance is largely reduced, which can bring excellent output characteristics.

In the present description, "amorphous structure" means structure such that an apparent crystal structure cannot be substantially confirmed in a crystal analysis by electron diffraction. For example, when a halo image indicating amorphization is observed in the tungsten-concentrated layer 14 when an electron diffraction pattern of the cathode active material is observed, it can be said that the tungsten-concentrated layer 14 has an amorphous structure.

The thickness of the tungsten-concentrated layer 14 is not particularly limited, but may be 100 nm or less. In view of degradation of durability due to an increase in the W concentration in the entire cathode active material 10 etc., the thickness of the tungsten-concentrated layer 14 can be 80 nm or less, can be 70 nm or less, can be 60 nm or less, or can be 50 nm or less. In contrast, in view of suitably effective improvements for durability and a suitably effective reduction in the resistance by the tungsten-concentrated layer 14, the lower limit of the thickness of the tungsten-concentrated layer 14 can be 10 nm or more, can be 20 nm or more, can be 30 nm or more, or can be 40 nm or more. The thickness of the tungsten-concentrated layer 14 can be obtained by, for example, obtaining a cross sectional TEM image of the cathode active material layer 54, randomly selecting 20 or more of the cathode active materials 10 in the cross sectional TEM image, and calculating the mean value of the thicknesses of the tungsten-concentrated layers 14 in the selected cathode active materials 10.

While there is no intention to limit the present disclosure, the tungsten-concentrated layer 14 having an amorphous structure can be formed by, for example, using a physical impact by sputtering. Specifically, a crystallization method is carried out on a solution in the state where a precursor of the core part 12 is dispersed therein: the composition ratio of W of the solution (for example, W/(W+Ni+Co+Mn)) is higher than a solution used when the core part 12 is generated. This can generate a precursor particle such that a precursor of the tungsten-concentrated layer 14 is formed over the surface of the precursor of the core part 12. This precursor particle, along with a lithium compound, is calcined to introduce lithium thereinto, to form a tungsten-concentrated layer having a layered structure over the surface of the core part. Then, tungsten oxide $WO_3$ is made to impact the tungsten-concentrated layer of a layered structure using sputtering, which destroys the crystal structure of the tungsten-concentrated layer, which makes it possible to obtain a core-shell particle such that the tungsten-concentrated layer 14 of an amorphous structure is formed over the surface of the core part 12 of a layered structure.

c. Lithium-Tungsten Compound Particle

Next, the cathode active material 10 in the present embodiment is such that the lithium-tungsten compound particle 16 adheres to at least part of the surface of the tungsten-concentrated layer 14. This can suppress degradation of the core part 12 due to contact with the nonaqueous electrolyte, which makes it possible to contribute to improvements for durability. The lithium-tungsten compound particle 16 also has the function of improving the concentration of Li ions on the surface of the cathode active material 10, and the function of improving Li-ion conductivity on the surface of the cathode active material 10. This also makes it possible to contribute to improvements for output characteristics due to a reduction of the cathode resistance.

The lithium-tungsten compound particle 16 is a particle containing Li and W. Typically, the lithium-tungsten compound particle 16 is formed by introduction of Li into a precursor particle whose main constituent is tungsten oxide $WO_3$, and contains lithium tungstate as the main constituent. The ratio of the number of Li atoms and the number of W atoms is not particularly limited: Li and W constitute lithium tungstate. For example, lithium tungstate may have the composition of $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_9W_{19}O_{55}$, $Li_3W_{10}O_{30}$, $Li_{18}W_5O_{15}$, or the like. Among them, lithium tungstate can have the composition represented by $Li_pWO_q$ where $0.3 \leq p \leq 6.0$ and $3.0 \leq q \leq 6.0$, and can have the composition represented by $Li_2WO_4$. Lithium tungstate may be hydrated. A precursor $WO_3$ into which Li is not introduced may exist in the lithium-tungsten compound particle 16. The W atomic concentration in the lithium-tungsten compound particle 16 is higher than the foregoing atomic concentrations of the core part 12 and the tungsten-concentrated layer 14. For example, when measurement is carried out by TEM-EDX, W at an atomic concentration of 90 at % or more is confirmed in the lithium-tungsten compound particle 16.

The lithium-tungsten compound particle 16 may also contain any elements other than Li and W. For example, elements derived from other members such as the core part 12, the tungsten-concentrated layer 14, and the nonaqueous electrolyte solution may be contained in the lithium-tungsten compound particle 16 according to manufacturing conditions and use conditions. At this time, examples of elements that may be contained in the lithium-tungsten compound particle 16 include Ni, Co, Mn, Mg, Ca, Al, Ti, V, Cr, Si, Y, Zr, Nb, Mo, Hf, Ta, Na, Fe, Zn, Sn, B, C, Si, P, S, F and Cl.

The lithium-tungsten compound particle 16 has only to adhere to at least part of the surface of the tungsten-concentrated layer 14. The aspect of the lithium-tungsten compound particle 16 is not particularly limited. For example, the lithium-tungsten compound particle 16 may adhere to the surface of the tungsten-concentrated layer 14 in the state where primary particles thereof are dispersing as shown in FIG. 3, and may form a secondary particle such that the primary particles aggregate, to adhere to a particular place. The lithium-tungsten compound particles may further aggregate to form a thin film to cover part of the surface of the tungsten-concentrated layer. In view of suitably effective improvements for durability and a suitably effective reduction of the resistance by the lithium-tungsten compound particle 16, the coverage rate of the lithium-tungsten compound particle 16 can be 5% or more, can be 10% or more, can be 15% or more, or can be 20% or more. In contrast, in view of a suitably effective reduction of the resistance by the tungsten-concentrated layer 14 of an amorphous structure, the coverage rate of the lithium-tungsten compound particle 16 can be 50% or less, can be 45% or less, may be 40% or less, or can be 35% or less. This can secure the contact area of the tungsten-concentrated layer 14 and the nonaqueous electrolyte. On a backscattered electron image of a surface SEM, a part to which the lithium-tungsten compound particle 16 adheres has a higher W concentration than a part to which the lithium-tungsten compound particle 16 does not adhere, and thus is brighter in the image. Thus, the backscattered electron image is processed to obtain the area ratio of a brighter part (area of a brighter part/(area of a brighter part+area of a darker part)), which makes it possible to calculate "coverage rate of the lithium-tungsten compound particle".

The mean particle size D50 of the lithium-tungsten compound particle 16 is not particularly limited, but for example, can be nm or more, can be 5 nm or more, or can be 10 nm or more. This can lead to an effective reduction of the resistance by the lithium-tungsten compound particle 16. In contrast, the upper limit of the mean particle size of the lithium-tungsten compound particle 16 can be 500 nm or less, can be 300 nm or less, can be 200 nm or less, or can be 100 nm or less, which also makes it possible to contribute to improvements for an effective reduction in the resistance. The mean particle size of the lithium-tungsten compound particle 16 can be measured according to the same procedures as those for the foregoing mean particle size of the core part 12.

While there is no intention to limit the present disclosure, the lithium-tungsten compound particle 16 can be generated conforming to a known method disclosed in JP-A-2017-84628 etc. For example, a core-shell particle such that the tungsten-concentrated layer 14 of an amorphous structure is formed over the surface of the core part 12 of a layered structure is prepared, this core-shell particle is mixed with a tungsten compound particle that does not contain Li (for example, $WO_3$ particle) in a given solvent (such as water and alcohol), and thereafter the solvent is dried by heating at approximately 150° C. or the like. This causes Li derived from the core-shell particle to be supplied to the tungsten compound particle to form the lithium-tungsten compound particle 16, to cause this lithium-tungsten compound particle 16 to adhere to the surface of the tungsten-concentrated layer 14.

d. Entire Structure of Cathode Active Material

As the foregoing description, the cathode active material 10 in the present embodiment includes the core part 12 containing a lithium-transition metal composite oxide of a layered structure, the tungsten-concentrated layer 14 having an amorphous structure, whose W concentration is higher than that of the core part 12, and the lithium-tungsten compound particle 16 containing Li and W. Such a cathode active material 10 can suppress degradation of various kinds, and can be effective in a reduction of the resistance. Therefore, the lithium ion secondary batten 100 using such a cathode active material 10 can bring excellent output characteristics while securing desired durability.

The lithium ion secondary battery according to one embodiment of the present disclosure has been described so far. The foregoing description is just an example, and structures of various kinds may be suitably modified according to use and purposes as long as the effect of the present disclosure is not extremely spoiled.

For example, in the foregoing embodiment, the cathode active material 10 such that the tungsten-concentrated layer 14 is formed over the surface of a primary particle of the core part 12, and the lithium-tungsten compound particle 16 adheres to the tungsten-concentrated layer 14 is used. See FIG. 3. The aspect of the cathode active material used in the nonaqueous electrolyte secondary battery of the present disclosure is however not limited to the foregoing embodiment. For example, the tungsten-concentrated layer may be formed over the surface of a secondary particle such that the primary particles of the core parts aggregate (that is, a region in contact with the electrolyte), to the tungsten-concentrated layer the lithium-tungsten compound particle adhering. As the foregoing, the cathode active material such that the tungsten-concentrated layer and the lithium-tungsten compound particle are formed with the secondary particle of the core parts for a core can also suppress degradation of various kinds, to lead to an effective reduction of the resistance.

As shown in FIG. 1, the foregoing embodiment is targeted on the rectangular lithium ion secondary battery 100 including the flat wound electrode body 20. The nonaqueous electrolyte secondary battery of the present disclosure is however not limited to such a lithium ion secondary battery 100. For example, the present disclosure can be applied to lithium ion secondary batteries including a stacked electrode body, cylindrical lithium ion secondary batteries, laminated lithium ion secondary batteries, and so on. Further, the present disclosure can be also applied to nonaqueous electrolyte secondary batteries other than the lithium ion secondary battery.

Test Example

Test example concerning the present disclosure will be hereinafter described. The present disclosure is not intended to be limited to such test example.

A. First Test

In this test, eight types of lithium ion secondary batteries were made using a cathode active material including a tungsten-concentrated layer of an amorphous structure, and a cathode active material not including a tungsten-concentrated layer of an amorphous structure, to evaluate the performance of each battery.

1. Preparing Samples i. Sample 1

First, a first raw material aqueous solution containing nickel Ni, cobalt Co, manganese Mn, and tungsten W at the molar ratio of 1:1:1:0.0015 was prepared. A reactant solution whose pH was adjusted using sulfuric acid and ammonia water was prepared, and poured into a reaction vessel. Then, the reactant solution was stirred as pH thereof was controlled using a pH regulator such that a sodium carbonate aqueous solution and an ammonium carbonate aqueous solution were mixed, the first raw material aqueous solution was dropped into the reactant solution at a given rate, to crystallize a particle of a transition-metal composite hydroxide that was to be a precursor of a core part.

Next, into the reactant solution in which the precursor of a core part was crystallized, a raw material aqueous solution (second raw material aqueous solution) whose concentration of tungsten was higher than that of the first raw material aqueous solution was dropped, to generate a precursor particle such that a precursor of a tungsten-concentrated layer was formed over the surface of the precursor of the core part. The second raw material aqueous solution used here was an aqueous solution containing Ni, Co, Mn and W at the molar ratio of 1:1:1:0.02.

Next, the generated precursor particle was rinsed and thereafter filtered and dried to obtain a dried powder. The dried powder of the precursor particle and lithium carbonate were mixed to be calcined (calcining temperature: 800° C., calcining time: 6 hours). This resulted in introduction of Li into each precursor of the core part and the tungsten-concentrated layer, to obtain a core-shell particle (base material) such that the tungsten-concentrated layer whose W concentration was higher than that of the core part was formed over the surface of the core part that was made from a lithium-nickel-cobalt-manganese composite oxide of a layered structure.

Next, tungsten oxide $WO_3$ was made to impact the surface of the core-shell particle by a barrel sputtering machine manufactured by Furuya Metal Co., Ltd., to amorphize the tungsten-concentrated layer by a physical impact. Next, the amorphized core-shell particle and $WO_3$ at the ratio of 100:10 were added to a solvent (water) to be mixed, and the mixed solution was dried (temperature: 150° C., time: 12 hours), to introduce part of Li of the core part and the tungsten-concentrated layer into $WO_3$. This resulted in formation of the tungsten-concentrated layer of an amorphous structure over the surface of the core part of a layered structure, to generate a cathode active material such that a lithium-tungsten compound (LW compound) adhered to the surface of this tungsten-concentrated layer.

A cathode active material layer such that the cathode active material, which was obtained in the foregoing steps, a conductive material (acetylene black), and a binder (PVDF) were mixed so as to have a ratio of 98:1:1 was prepared. This cathode active material layer was applied over the surface of a cathode current collector (aluminum foil), to obtain a cathode sheet. In contrast, an anode active material layer such that an anode active material (natural graphite), a thickener (CMC), and a binder (SBR) were mixed so as to have a ratio of 98:1:1 was prepared. This anode active material layer was formed over the surface of an anode current collector (copper foil), to obtain an anode sheet. Next, the cathode sheet and the anode sheet were layered to each other via separators (triple-layer sheets of PP-PE-PP) having a thickness of 24 μm. The obtained layered body was wound to obtain a wound electrode body. The wound electrode body was stored into the inside of a rectangular case made from an aluminum alloy, and the case was hermetically sealed after a nonaqueous electrolyte solution was poured thereinto, to make a lithium ion secondary battery for evaluation test (Sample 1). As the nonaqueous electrolyte solution, a solution such that a supporting salt ($LiPF_6$) of 1 M was dissolved in a mixed solvent containing ethylene carbonate (EC), dimethyl carbonate (DMC), and ethyl methyl carbonate (EMC) so as to have a volume ratio of 3:4:3 was used.

In this test, the cathode active material was analyzed by TEM-EDX before the cathode sheet was prepared, to measure the W atomic concentration A in the tungsten-concentrated layer, and the W atomic concentration B in the core part according to the foregoing procedures. The measurement results are shown in Table 1.

ii. Sample 2

In Sample 2, only the core part of a lithium-nickel-cobalt-manganese composite oxide of a layered structure was used as the cathode active material. That is, a lithium ion secondary battery for test was prepared under the same conditions as for Sample 1 except that a lithium-nickel-cobalt-manganese composite oxide not containing W where the tungsten-concentrated layer or the lithium-tungsten compound particle were not formed was used as the cathode active material.

iii. Sample 3

In Sample 3, the tungsten-concentrated layer was not formed. Specifically, a battery for test was prepared under the same conditions as for Sample 1 except that a cathode active material such that the lithium-tungsten compound particle was directly adhered to the surface of a lithium-nickel-cobalt-manganese composite oxide not containing W (core part) was used.

iv. Sample 4

In Sample 4, the tungsten-concentrated layer was not amorphized, and the lithium-tungsten compound particle was not adhered. That is, a battery for test was prepared under the same conditions as for Sample 1 except that the core-shell particle such that the tungsten-concentrated layer of a layered structure was formed over the surface of the core part was used as the cathode active material.

v. Sample 5

In Sample 5, the tungsten-concentrated layer was not amorphized. That is, a battery for test was prepared under the same conditions as for Sample 1 except that a cathode active material such that the tungsten-concentrated layer of a layered structure was formed over the surface of the core part and the lithium-tungsten compound particle adhered to the surface of this tungsten-concentrated layer was used.

vi. Samples 6 to 8

In this test, a cathode active material such that an outer layer whose concentration of tungsten was lower than that of the core part, or an outer layer whose concentration of tungsten was equal to that of the core part was formed over the surface of the core part and the lithium-tungsten compound particle was adhered to the outer layer was also prepared. Batteries for evaluation made by using this cathode active material are referred to as Samples 6 to 8. The conditions other than those about the cathode active material were the same as for Sample 1.

2. Evaluation Test

Here, the battery resistance of the batteries for test of each sample was measured to evaluate output characteristics, and the capacity retention after a durability process was measured to evaluate durability.

i. Evaluation of Output Characteristics

First, the batteries for evaluation of each sample were subjected to an activation process (initial charging) in a constant current-constant voltage system in the environment at 25° C.: the batteries were subjected to constant current charging to 4.2 V at a current value of ⅓ C, and thereafter subjected to constant voltage charging until the current value was 1/50 C, to reach a fully charged state. Thereafter the batteries were subjected to constant current discharging at a current value of ⅓ C until the voltage was 3.0 V.

Next, the batteries for evaluation after the activation process were adjusted to have an open-circuit voltage of 3.70 V, and thereafter kept in the temperature environment of −28° C. Then, the batteries were discharged at a current value of 20 C for 8 seconds, to obtain the amount of voltage drop ΔV at this time, and this amount of voltage drop ΔV was divided by the discharge current value (20 C), to calculate the battery resistance. Lower battery resistance can lead to the evaluation result of higher output characteristics. The calculation results are shown in Table 1. In Table 1, relative evaluation when the battery resistance of Sample 2 is defined as 100 is shown.

ii. Evaluation of Durability

Here, the batteries for evaluation after the foregoing activation process underwent a high temperature durability test at 60° C. The charge/discharge cycle of CC charging at a rate of 2 C until the voltage rose to 4.2 V and then CC discharging at a rate of 2 C until the voltage dropped to 3.0 V was repeated 500 times as the temperature of the durability test (60° C.) was kept. The CC discharge capacities at the first and 500th cycles were measured, to calculate the proportion of the CC discharge capacity at the 500th cycle to the CC discharge capacity at the first cycle as the capacity retention (%). A higher capacity retention can lead to the evaluation result of higher durability. The calculation results are shown in Table 1.

TABLE 1

| | LW compound | W atomic concentration (at %) | | amorphized | battery resistance (vs Sample 2) | capacity retention (%) |
|---|---|---|---|---|---|---|
| | | outer layer A | core part B | | | |
| Sample 1 | contained | 0.5 | 0.4 | yes | 90 | 69 |
| Sample 2 | not contained | — | 0 | no | 100 | 63 |
| Sample 3 | contained | — | 0 | no | 97 | 69 |
| Sample 4 | not contained | 0.5 | 0.4 | no | 98 | 67 |
| Sample 5 | contained | 0.5 | 0.4 | no | 96 | 69 |
| Sample 6 | contained | 0.2 | 0.8 | no | 97 | 64 |
| Sample 7 | contained | 0.5 | 0.5 | no | 96 | 67 |
| Sample 8 | contained | 0.4 | 0.5 | no | 97 | 68 |

As shown in Table 1, comparatively high durability (capacity retention) of approximately 67% to 69% was confirmed in Sample 2 such that the lithium-tungsten compound particle was not adhered, and Samples 1, 3 to 5, 7 and 8, which are other than Sample 6 such that the outer layer whose W concentration was low was formed. In contrast, when output characteristics (battery resistance) were compared, it was confirmed that Sample 1 brought excellent output characteristics most. From the foregoing, it was found that a tungsten-concentrated layer is formed over the surface of a core part, a lithium-tungsten compound particle is adhered to this tungsten-concentrated layer, and then the tungsten-concentrated layer is amorphized, which makes it possible to make a secondary battery that brings excellent output characteristics while desired durability is secured.

B. Second Test

In this test, conditions for bringing a higher level of durability and output characteristics were examined when a cathode active material such that a tungsten-concentrated layer of an amorphous structure was formed over the surface of a core part and a lithium-tungsten compound particle adhered to this tungsten-concentrated layer, like Sample 1.

1. Preparing Samples

Seven cathode active materials that were made under the same conditions for Sample 1 except that the W atomic concentration A in the tungsten-concentrated layer and the W atomic concentration B in the core part were different in each cathode active material were prepared, to make batteries for evaluation (Samples 9 to 15) using each cathode active material. The W atomic concentration A in the tungsten-concentrated layer, and the W atomic concentration B in the core part in each sample are shown in Table 2.

2. Evaluation Test

Battery resistance and capacity retention were measured under the same conditions for the first test, to evaluate output characteristics and durability. The results are shown in Table 2. In Table 2, the battery resistance and capacity retention of Sample 1 measured in the first test were shown together.

TABLE 2

| | LW compound | W atomic concentration (at %) | | | battery resistance (vs Sample 2) | capacity retention (%) |
| | | W concentration layer A | core part B | amorphized | | |
|---|---|---|---|---|---|---|
| Sample 1 | contained | 0.5 | 0.4 | yes | 90 | 69 |
| Sample 9 | contained | 3.6 | 0.4 | yes | 84 | 69 |
| Sample 10 | contained | 0.8 | 0.2 | yes | 89 | 71 |
| Sample 11 | contained | 3.6 | 0.3 | yes | 84 | 72 |
| Sample 12 | contained | 2.6 | 0.4 | yes | 83 | 70 |
| Sample 13 | contained | 1 | 0.2 | yes | 84 | 75 |
| Sample 14 | contained | 2.6 | 0.2 | yes | 83 | 74 |
| Sample 15 | contained | 3.3 | 0.3 | yes | 82 | 74 |

As shown in Table 2, as the W atomic concentration A in the tungsten-concentrated layer increased, the battery resistance tended to be reduced (output characteristics tended to be improved). In contrast, as the W atomic concentration A in the tungsten-concentrated layer was increased too much, the capacity retention (durability) tended to lower. As the W atomic concentration B in the core part was increased, durability also tended to lower. In view of these tendencies, it is understood that the W atomic concentration A in the tungsten-concentrated layer is 1 at % or more and 3.6 at % or less, and the W atomic concentration B in the core part is 0.3 at % or less, which bring an especially high level of durability and output characteristics.

Specific examples of the present disclosure have been described in detail so far. These are just examples, and do not limit the claims. The techniques in the claims encompass various modifications and changes of the foregoing specific examples.

What is claimed is:

1. A nonaqueous electrolyte secondary battery comprising a cathode, an anode, and a nonaqueous electrolyte,
the cathode including a cathode active material layer that contains a granular cathode active material;
the granular cathode active material including:
a core part that contains a lithium-transition metal composite oxide of a layered structure, a mean particle size of the core part is from 0.1 µm to 20 µm;
a tungsten-concentrated layer that is formed over a surface of the core part and has a higher tungsten concentration determined by a TEM-EDX analysis than the core part; and
a lithium-tungsten compound particle that adheres to at least part of a surface of the tungsten-concentrated layer and contains tungsten and lithium, the tungsten-concentrated layer is an amorphous structure, and the lithium-tungsten compound particle has a higher tungsten concentration than the tungsten-concentrated layer, and an atomic concentration of tungsten in the lithium-tungsten compound particle is 90 at % or more based on a total number of transition metal atoms.

2. The nonaqueous electrolyte secondary battery according to claim 1, wherein an atomic concentration A of tungsten in the tungsten-concentrated layer is 1 at % or more and 3.6 at % or less.

3. The nonaqueous electrolyte secondary battery according to claim 1, wherein an atomic concentration B of tungsten in the core part is 0.3 at % or less.

4. The nonaqueous electrolyte secondary battery according to claim 1, wherein the core part comprises Li, Ni, Co, Mn, and O.

5. The nonaqueous electrolyte secondary battery according to claim 1, wherein a mean particle size of the lithium-tungsten compound particle is from 5 nm to 500 nm.

* * * * *